(12) United States Patent  
Matsuzawa

(10) Patent No.: US 8,787,749 B2  
(45) Date of Patent: Jul. 22, 2014

(54) ELECTRONIC APPARATUS

(75) Inventor: Shuichi Matsuzawa, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 13/588,949

(22) Filed: Aug. 17, 2012

(65) Prior Publication Data

US 2013/0051786 A1    Feb. 28, 2013

(30) Foreign Application Priority Data

Aug. 22, 2011    (JP) .................................. 2011-180359

(51) Int. Cl.

| | |
|---|---|
| *G03B 17/02* | (2006.01) |
| *H04N 5/225* | (2006.01) |
| *H05K 5/00* | (2006.01) |

(52) U.S. Cl.  
USPC ........... 396/535; 396/539; 348/373; 348/376; 361/679.01

(58) Field of Classification Search  
USPC .................. 396/535, 539; 348/373, 375, 376; 361/679.01  
See application file for complete search history.

(56) References Cited

U.S. PATENT DOCUMENTS

| | | | | |
|---|---|---|---|---|
| 4,348,095 A | * | 9/1982 | Suzuki et al. ................. | 396/539 |
| 2009/0086440 A1 | * | 4/2009 | Takahama ..................... | 361/724 |

FOREIGN PATENT DOCUMENTS

JP    2006-84653 A    3/2006

* cited by examiner

*Primary Examiner* — Rochelle-Ann J Blackman  
(74) *Attorney, Agent, or Firm* — Canon USA Inc IP Division

(57) ABSTRACT

An electronic apparatus includes an exterior cover including a strap attachment portion, a circuit board on which an electric element that generates heat is mounted, and a chassis member to which the circuit board is fixed and through which the heat generated by the electric element is transferred. The chassis member is formed of a metallic material, and the chassis member includes a reinforcing portion arranged to overlap the strap attachment portion to reinforce the strap attachment portion. The reinforcing portion is disposed to be exposed inside the strap attachment portion.

8 Claims, 10 Drawing Sheets

ELECTRONIC APPARATUS

BACKGROUND OF THE INVENTION

1. Field of the Invention

The present invention relates to an electronic apparatus which is provided with a strap attachment structure.

2. Description of the Related Art

Many small-sized portable electronic apparatuses such as a digital camera are configured such that a pendant strap can be attached thereto. Carrying the electric apparatus by putting the strap around a user's neck or wrist is helpful to improve portability and prevent falling. A strap attachment portion to which the strap is attached needs to have strength enough to bear a force applied thereto even when the strap is pulled.

In addition, the strap attachment portion has an impact on the exterior appearance of a digital camera, and thus if the strap attachment portion is poor in visual quality, the digital camera is degraded in its exterior appearance quality.

Japanese Patent Application Laid-Open No. 2006-84653 discuses that the strap attachment portion formed through a die casting process is used in a digital camera.

SUMMARY OF THE INVENTION

The present invention is directed to an electronic apparatus that includes a strap attachment structure capable of reducing cost, having adequate strength and good exterior appearance quality.

According to an aspect of the present invention, an electronic apparatus includes an exterior cover including a strap attachment portion, a circuit board on which an electric element that generates heat is mounted, and a chassis member to which the circuit board is fixed and through which the heat generated by the electric element is transferred. The chassis member is formed of a metallic material, and the chassis member includes a reinforcing portion arranged to overlap the strap attachment portion to reinforce the strap attachment portion. The reinforcing portion is disposed to be exposed inside the strap attachment portion.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 2A:
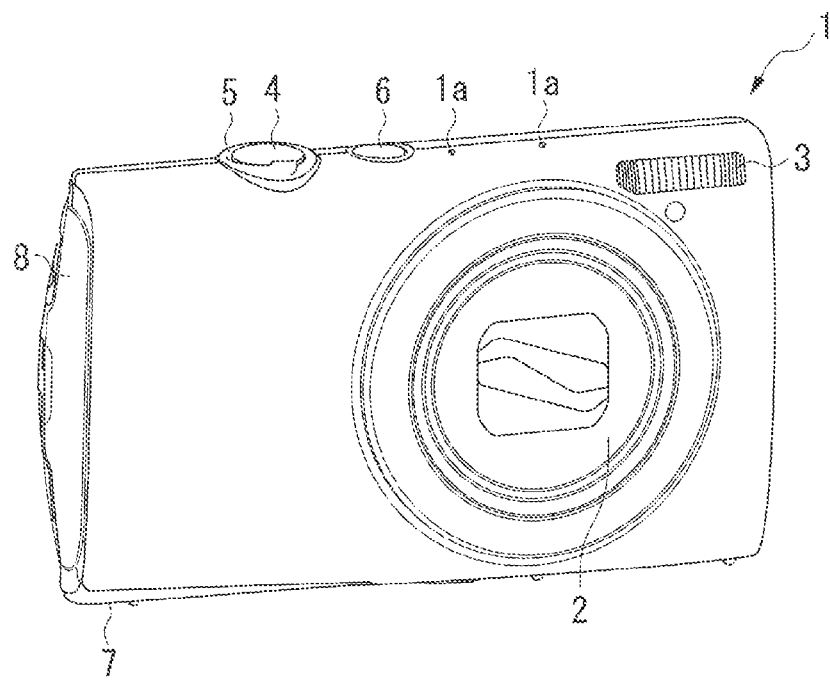
FIGS. 2A and 2B are perspective views illustrating the exterior appearance of the digital camera.
Figure 2B:
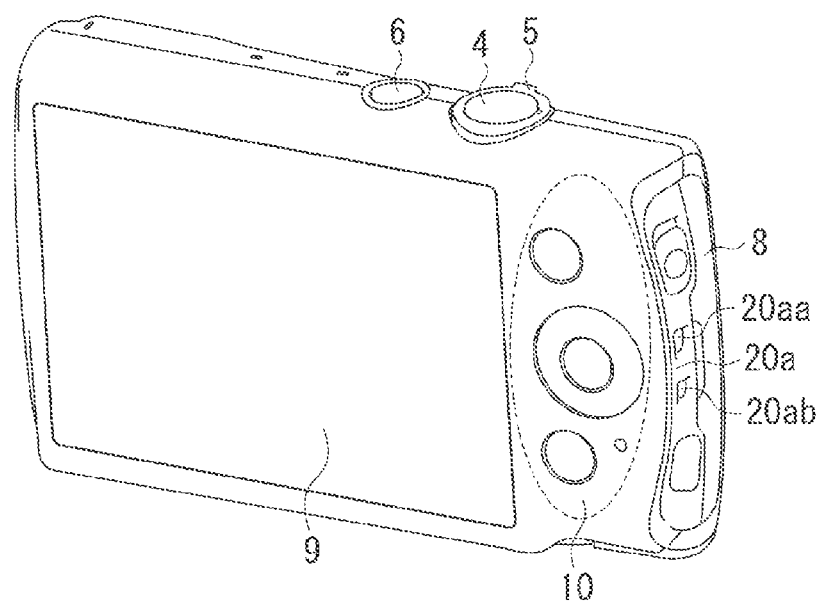

FIGS. 2A and 2B are perspective views illustrating the exterior appearance of a digital camera 1 as an electronic apparatus according to a first embodiment of the present invention. FIG. 2A is the perspective view illustrating the exterior appearance of the digital camera 1 when viewed from the front side thereof, and FIG. 2B is the perspective view illustrating the exterior appearance of the digital camera 1 when viewed from the back side thereof.

A photographic lens barrel 2 which forms an object image on an image sensor is fixed to the digital camera 1. The photographic lens barrel 2 is a retractable type of zoom lens which is retracted as illustrated in FIG. 2A when the digital camera 1 is not used.

In the rear of the photographic lens barrel 2, an image sensor, such as a charge-coupled device (CCD) or complementary metal-oxide semiconductor (CMOS) sensor, is disposed, which photoelectrically converts an optical image to generate image data.

In addition, a circuit board 14, on which a processing circuit performing image processing with respect to the output from the image sensor is mounted, is disposed in the digital camera 1.

As illustrated in FIG. 2A, the digital camera 1 is provided with a flash emission portion (flash emission window) 3, a release button 4, a zoom lever 5, and a power button 6 on the upper portion thereof. The release button 4 is configured so that a two-step press operation is available. When the release button 4 is pressed in a first step of the press operation, a shooting preparation operation (a light metering operation, a range-finding operation, and the like) is started. When the release button 4 is pressed in a second step of the pressing operation, an object is photographed and the image data of the object image is recorded on a recording medium. The zoom lever 5 is a rotationally operated type lever which is disposed on the outer periphery of the release button 4. When the power button 6 is pressed, the digital camera 1 is switched between a usable state (ready for image capture) and an unusable state (not ready for image capture). When the state is switched to the usable state by the power button 6, the retracted photographic lens barrel 2 is extended, so that the digital camera 1 enters the state ready for image capture.

A pair of microphone holes 1a, through which voice is introduced to a microphone built in the digital camera 1, is provided between the power button 6 and the flash emission portion 3.

As illustrated in FIG. 2A, a battery lid 7 is provided on the lower portion of the digital camera 1. The battery lid 7 opens or closes a battery storage chamber that stores a battery serving as the power supply of the digital camera 1, and a storage chamber that stores the recording medium for recording the captured image data.

As illustrated in FIG. 2A, on the side surface of the digital camera 1, jacks are provided for inputting or outputting power and signals, and a cover member 8 for protecting the jacks covers the input/output jacks. When the cover member 8 is opened, various kinds of connectors can be inserted into or removed from the input/output jacks.

As illustrated in FIG. 2B, a display unit 9 is provided on the back surface of the digital camera 1. A plurality of operation buttons 10 are provided on the side of the display unit 9. A cross-shaped button disposed at the center of the plurality of the operation buttons 10 is configured so that four places of the left, right, top, and bottom sides thereof and one place at the center can be pressed.

As illustrated in FIG. 2B, a side surface cover 20 as an exterior cover is disposed on the side surface of the digital camera 1. A strap attachment portion 20a is formed on the side surface cover 20. Two strap passing holes 20aa and 20ab are formed on the side surface cover 20.

Next, the internal structure of the digital camera 1 will be described.

Figure 3:
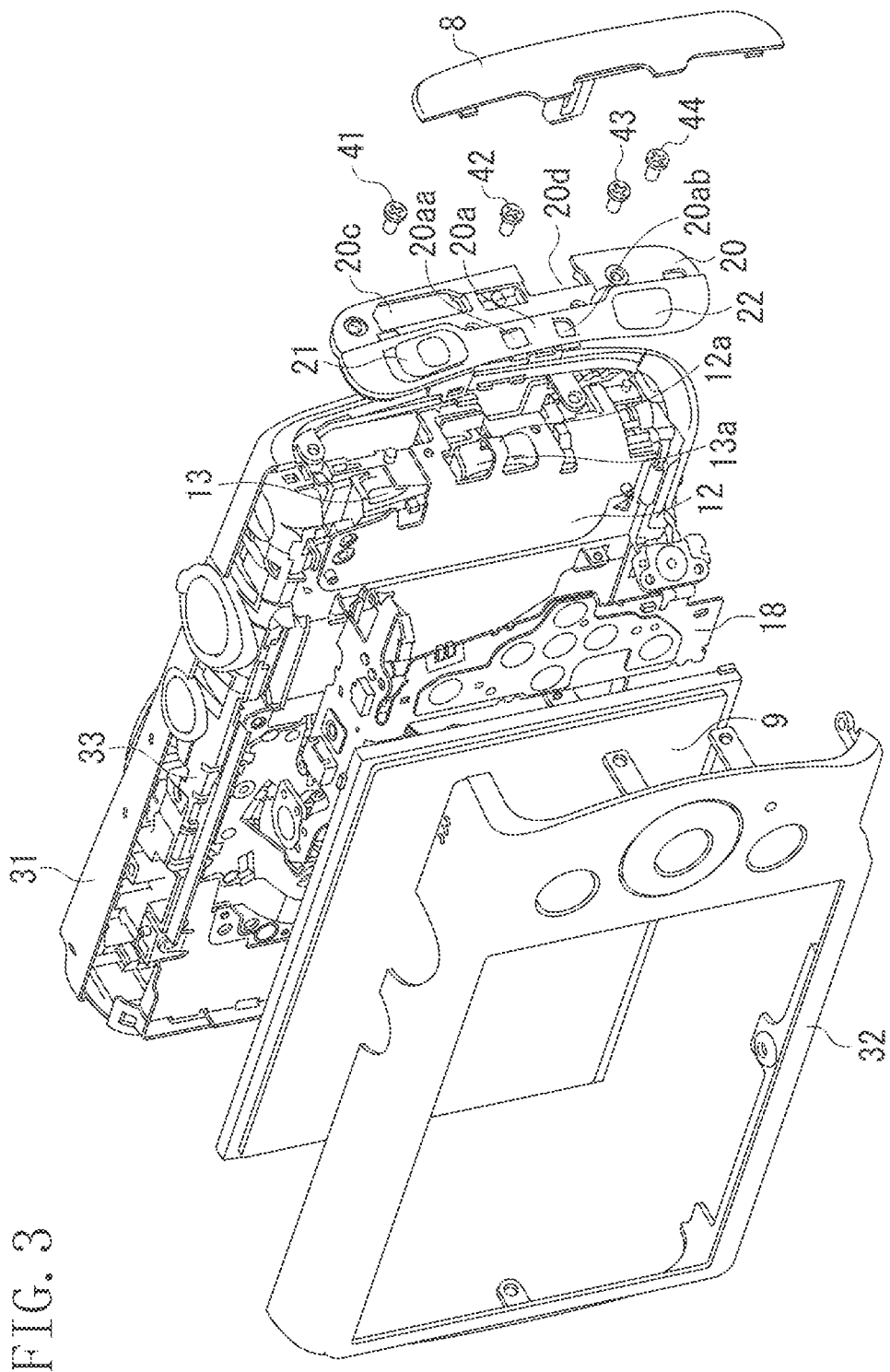
FIG. 3 is an exploded perspective view illustrating an internal structure of the digital camera.

FIG. 3 is an exploded perspective view illustrating the internal structure of the digital camera 1.

The digital camera 1 is covered with two exterior covers, a front cover 31 and a rear cover 32. Both the front cover 31 and the rear cover 32 are made of a metallic material.

Inside the rear cover 32, a top unit 33 is disposed on the upper side of the digital camera 1, and the display unit 9 is disposed on the back surface of the digital camera 1. FIG. 3 illustrates a state in which the display unit 9 and a flexible operation circuit board 18 are detached from a main chassis 12 serving as a chassis member. The flexible operation circuit board 18 includes switches mounted on the positions thereof corresponding to the plurality of the operation buttons 10 which are attached to the rear cover 32.

The side surface cover 20 made of a resin material is disposed on the inside of the cover member 8 for protecting the jacks provided on the side surface of the digital camera 1. The side surface cover 20 is fixed to the main chassis 12 by four fixing screws 41 to 44. The strap attachment portion 20a is integrally formed on the side surface cover 20 to which the operation buttons 21 and 22 are attached. In addition, pore geometry portions 20c and 20d are formed on the side surface cover 20, through which the input/output jacks mounted on the circuit board 14 are inserted.

A reinforcing portion 12a is integrally formed on the main chassis 12 to reinforce the strap attachment portion 20a formed on the side surface cover 20. The reinforcing portion 12a is formed such that the front end of the main chassis 12 is bent. When the side surface cover 20 is fixed to the main chassis 12, the reinforcing portion 12a formed on the main chassis 12 is positioned on the inside of the strap attachment portion 20a formed on the side surface cover 20, thus reinforcing the strap attachment portion 20a.

The battery storage chamber 13 storing the battery is fixed to the main chassis 12 by the screws. A strap reception portion 13a, which joints strap passing holes 20aa and 20ab, is formed in the battery storage chamber 13. When the battery storage chamber 13 is fixed to the main chassis 12, the strap reception portion 13a is positioned on the inside of the reinforcing portion 12a. Therefore, when a user inserts a strap cord 17 into the strap passing hole 20aa, the strap cord 17 passes through between the reinforcing portion 12a and the strap reception portion 13a and then comes out of the strap passing hole 20ab.

Accordingly, the strap cord 17 is tied up to a portion in which the strap attachment portion 20a and the reinforcing portion 12a overlap each other. In other words, the strap attachment portion 20a made of a resin material is reinforced by the reinforcing portion 12a made of the metallic material. Even when the strap cord 17 is pulled by a powerful force, the reinforcing portion 12a is subjected to most of the force, so that the strap attachment portion 20a is not broken.

Figure 1A:
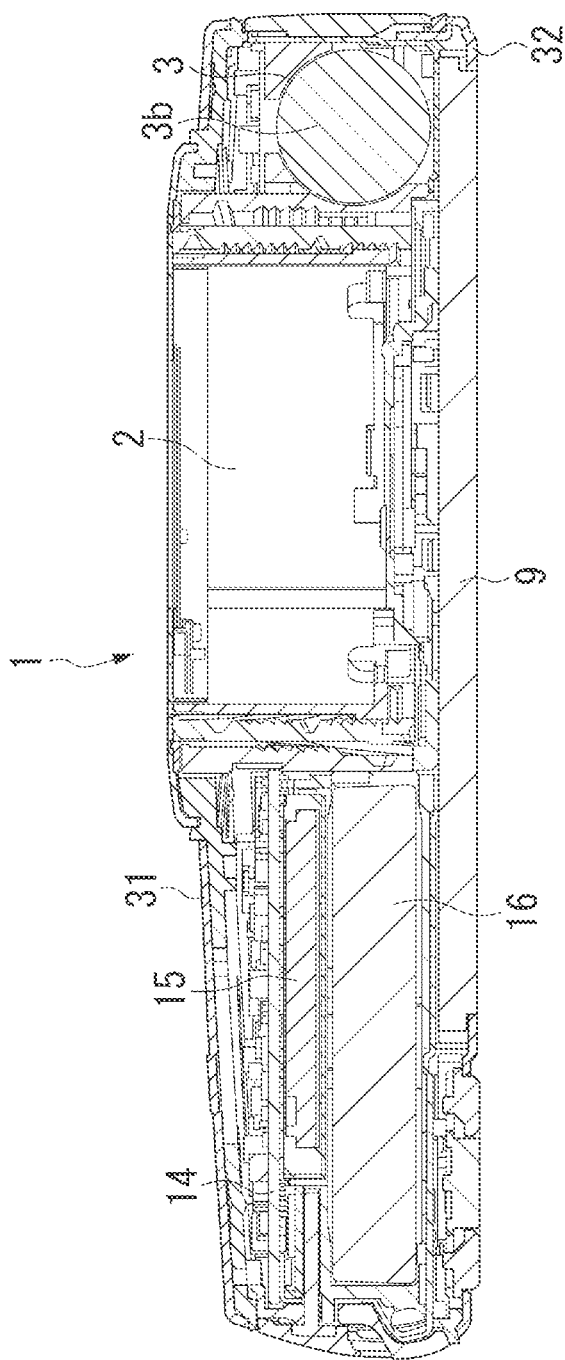
FIGS. 1A and 1B are diagrams illustrating an internal structure of a digital camera according to an embodiment of the invention.
Figure 1B:
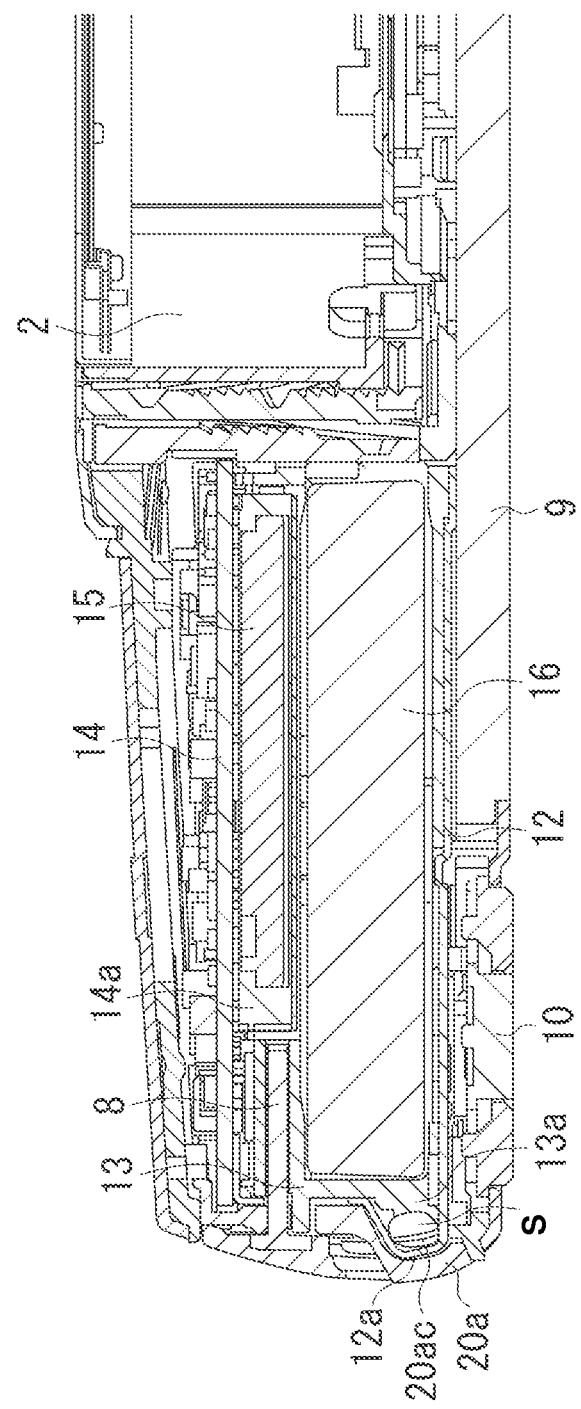

FIG. 1A illustrates a cross-sectional view taken along the center portion of the digital camera 1. FIG. 1B is a cross-sectional view illustrating the enlarged left side portion of the digital camera 1 in FIG. 1A.

As illustrated in FIG. 1A, the digital camera 1 is configured such that the photographic lens barrel 2 forming an object image on an image sensor is disposed substantially at the center portion. In FIG. 1, a main capacitor 3b which is a part of the flash emission portion 3 is disposed on the right side of the photographic lens barrel 2. The circuit board 14 is disposed on the left side of the photographic lens barrel 2. A card slot 14a into which a recording medium 15 such as a memory card is loaded is mounted on the back surface of the circuit board 14. The cover member 8 is disposed on the left side of the circuit board 14. The circuit board 14 is fixed to the main chassis 12. The battery storage chamber 13 in which a battery 16 is stored is disposed in the back surface of the circuit board 14. The battery storage chamber 13 is fixed to the main chassis 12. The display unit 9 is disposed on the right side of the back surface of the digital camera 1, and the plurality of the operation buttons 10 is disposed on the left side of the display unit 9.

As illustrated in FIG. 1B, the main chassis 12 is disposed between the battery storage chamber 13 and the display unit 9. The reinforcing portion 12a, which is formed in a curved shape protruding from the main chassis 12, is disposed along the rear side of the strap attachment portion 20a formed on the side surface cover 20. In addition, the strap reception portion 13a is formed on a portion facing the reinforcing portion 12a of the battery storage chamber 13. As illustrated in FIG. 1B, a space S is formed by the reinforcing portion 12a and the strap reception portion 13a, and the strap cord 17 is passed through this space S.

The main chassis 12 is formed of a plate-shaped metallic material that is punched and bent. The main chassis 12 includes a burr surface and a rollover surface on the end portions thereof, which are formed through the punching process. If the main chassis 12 is punched such that one of the end surfaces of the reinforcing portion 12a facing the strap reception portion 13a is to be the burr surface, the surface of the reinforcing portion 12a contacting the strap cord 17 becomes the burr surface when the strap cord 17 is passed through the space 15. In this case, it is considered that the strap cord 17 can be damaged by the burr.

Figure 6A:
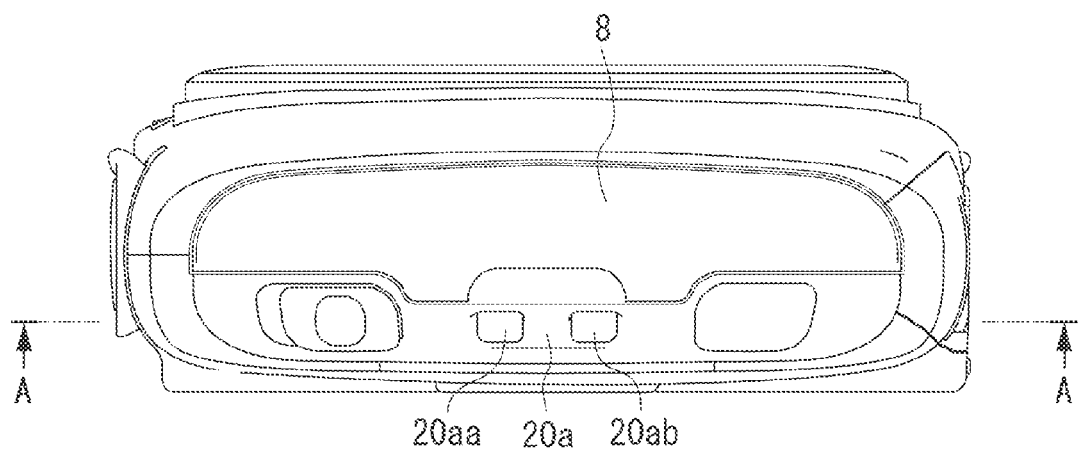
FIGS. 6A, 6B, and 6C are diagrams illustrating a strap attachment structure.
Figure 6B:
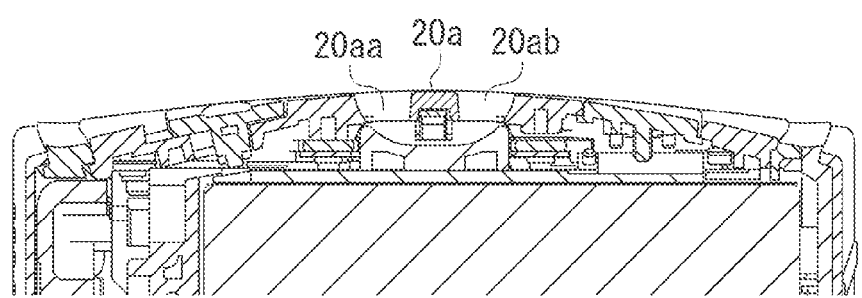
Figure 6C:
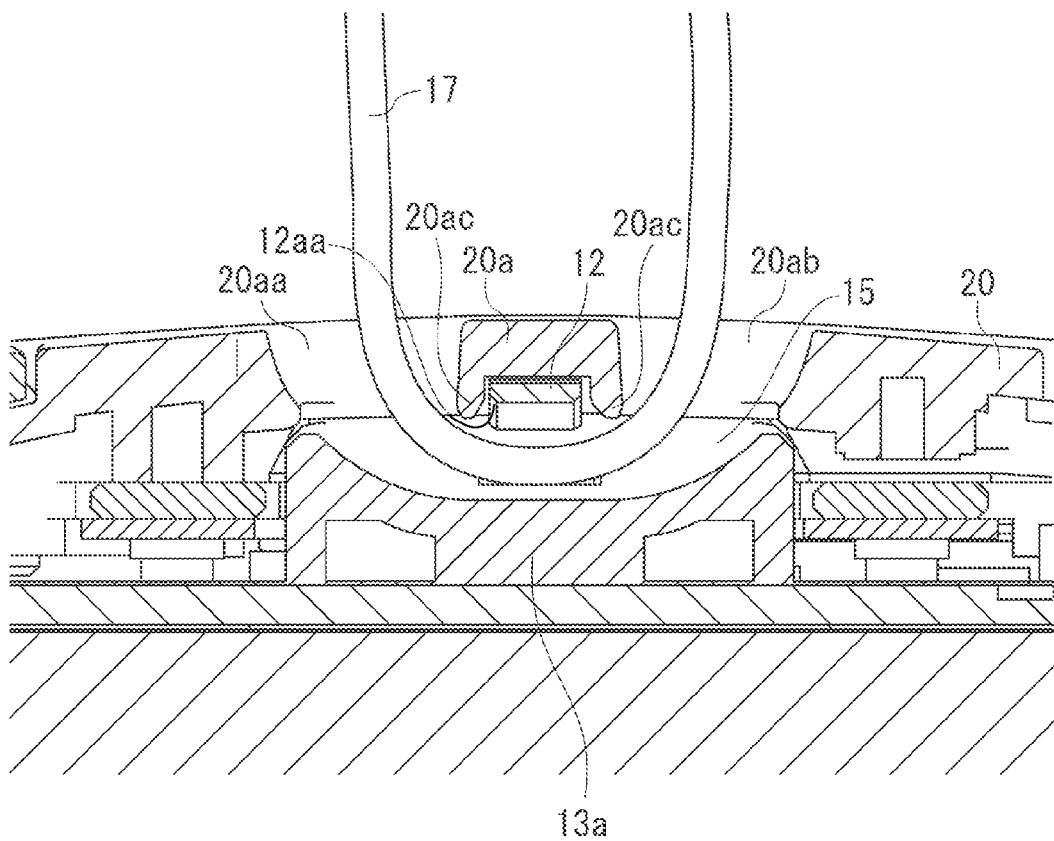

FIGS. 6A, 6B, and 6C are diagrams illustrating the strap attachment structure, which includes the strap attachment portion 20a of the side surface cover 20, the reinforcing portion 12a of the main chassis 12, and the strap reception portion 13a of the battery storage chamber 13. FIG. 6A is a side view of the digital camera 1, and FIG. 6B is a cross-sectional view taken along the line A-A in FIG. 6A. FIG. 6C is an enlarged view illustrating main parts of FIG. 6B.

As illustrated in FIG. 6C, according to the present embodiment, the main chassis 12 is punched such that one of the end surfaces of the reinforcing portion 12a facing the strap reception portion 13a becomes the burr surface on which a chamfering process is performed to form a chamfered portion 12aa. As illustrated in FIG. 6C, according to the present embodiment, ribs 20ac are formed to cover the end surfaces of the reinforcing portion 12a from the both sides of the strap attachment portion 20a formed on the side surface cover 20. The ribs 20ac prevents the end surfaces of the reinforcing portion 12a from contacting the strap cord 17, and thus prevents the strap cord 17 from being damaged.

In addition, if the main chassis 12 is punched such that one of the end surfaces of the reinforcing portion 12a facing the strap reception portion 13a becomes the rollover surface, this prevents the strap cord 17 from being damaged even when the chamfering process is not performed thereon.

Thus, this configuration can prevent the strap cord 17 from being damaged, even if the reinforcing portion 12a is formed on the main chassis 12 that is formed of a punched plate-shaped metallic material.

Figure 7:
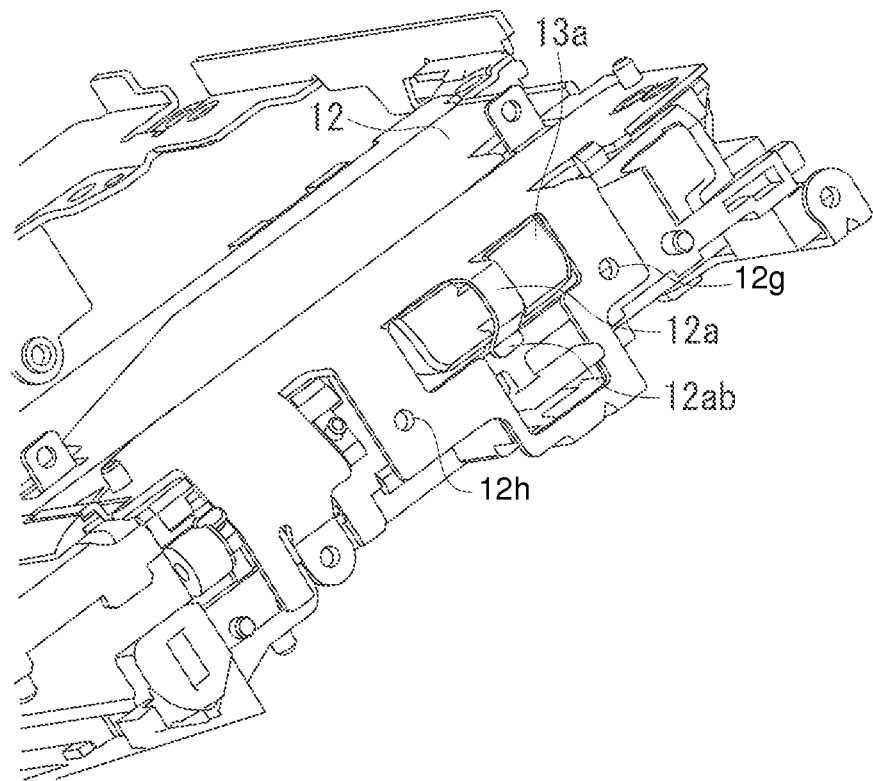
FIG. 7 is a diagram illustrating the shape of a reinforcing portion.

FIG. 7 is a diagram illustrating the shape of the reinforcing portion 12a. The reinforcing portion 12a is formed by bending the front end of the main chassis 12. The main chassis 12 includes a screw hole 12g with which the fixing screw 42 for fixing the side surface cover 20 is engaged and a screw hole 12h with which the fixing screw 43 for fixing the side surface cover 20 is engaged. As illustrated in FIG. 7, the reinforcing portion 12a is formed such that the front end portion 12ab of the reinforcing portion 12a is positioned on the line connecting the screw hole 12g and the screw hole 12h. In other words, the front end portion 12ab of the reinforcing portion 12a is disposed on the line connecting the places for fixing the side surface cover 20 and the main chassis 12.

Thus, even if a strong tensile force is applied to the reinforcing portion 12a after fixing the side surface cover 20 to the main chassis 12, the front end portion 12ab of the reinforcing portion 12a is pressed by the side surface cover 20, thus preventing the reinforcing portion 12a from being deformed.

Figure 4:
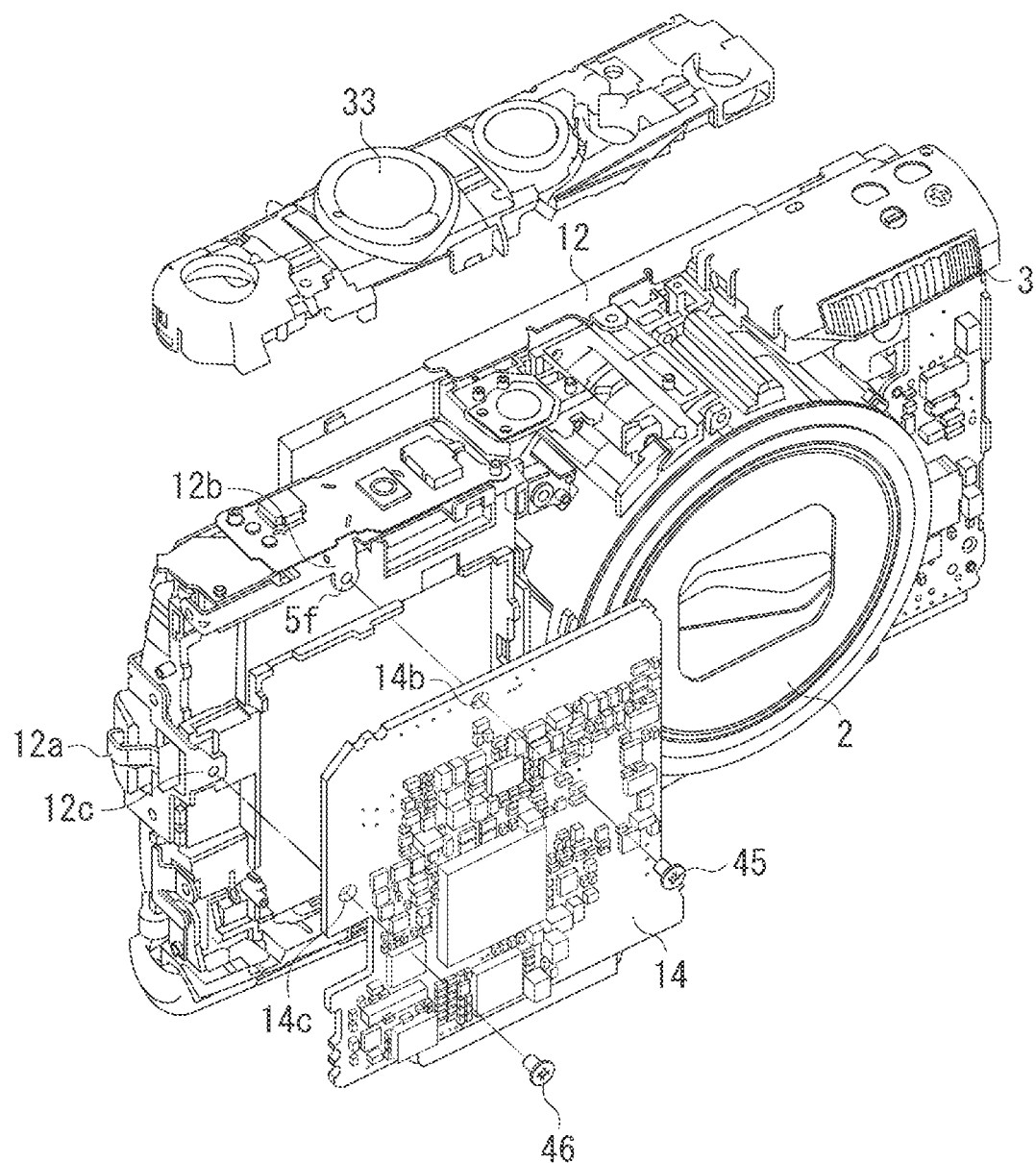
FIG. 4 is an exploded perspective view illustrating an internal structure of the digital camera.
Figure 5:
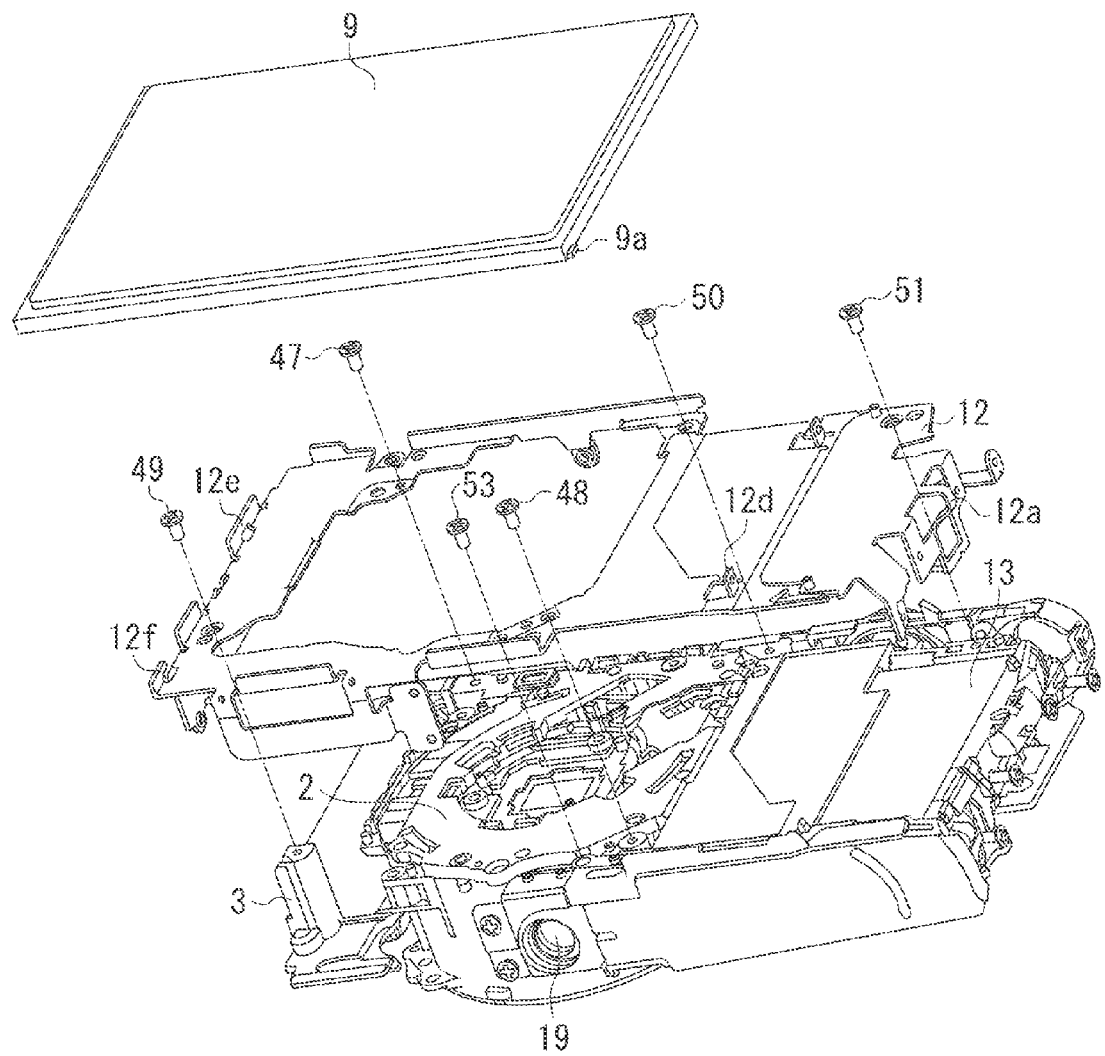
FIG. 5 is an exploded perspective view illustrating an internal structure of the digital camera.

FIGS. 4 and 5 are exploded perspective views illustrating the internal structure of the digital camera 1. In FIGS. 4 and 5, the front cover 31 and the rear cover 32 are not illustrated. FIG. 4 is the exploded perspective view of the front surface of the digital camera 1, and FIG. 5 is the exploded perspective view of the back surface of the digital camera 1.

As illustrated in FIG. 4, the main chassis 12 is integrally formed with a substrate fixing portion 12b, which is wrapped around from the upper surface of the battery storage chamber 13 to the front surface of the battery storage chamber 13, and a substrate fixing portion 12c, which is wrapped around from the side surface of the battery storage chamber 13 to the front surface of the battery storage chamber 13. A fixing screw 45 is passed through a screw hole 14b of the circuit board 14 and is engaged with the substrate fixing portion 12b, and a fixing screw 46 is passed through a screw hole 14c of the circuit board 14 and is engaged with the substrate fixing portion 12c, thereby fixing the circuit board 14 to the main chassis 12. At this time, the substrate fixing portions 12b and 12c of the main chassis 12 are fastened to a ground potential portion of the circuit board 14, so that the ground portion of the circuit board 14 is electrically connected to the main chassis 12. In addition, the heat generated from electric elements mounted on the circuit board 14 is transferred to the main chassis 12.

As illustrated in FIG. 5, the main chassis 12 is disposed on the back surface of the photographic lens barrel 2, the flash emission portion 3, and the battery storage chamber 13. The photographic lens barrel 2 is fixed to the main chassis 12 by fixing screws 47 and 48. The battery storage chamber 13 is fixed to the main chassis 12 by fixing screws 50 and 51. The flash emission portion 3 is fixed to the main chassis 12 by a fixing screw 49. A tripod 19 is fixed to the main chassis 12 by a fixing screw 53.

In the display unit 9, three claw pieces 9a are respectively formed on different positions (two pieces are not illustrated). The three claw pieces 9a are engaged with and held in attachment portions 12d, 12e, and 12f of the main chassis 12. The display unit 9 is configured to be slightly movable in a horizontal or vertical direction, and the external shape of the display unit 9 is engaged with openings formed on the rear cover 32. Thus, the position thereof is determined.

In this way, the circuit board 14, the photographic lens barrel 2, and the display unit 9 are fixed to the main chassis 12.

The heat generated from the electric elements mounted on the circuit board 14, the heat of the image sensor attached to the photographic lens barrel 2, and the heat generated by the display unit 9 are transferred to the main chassis 12.

The main chassis 12 is formed of a metallic material with high thermal conductivity. Inside the strap attachment portion 20a, the reinforcing portion 12a of the main chassis 12 is exposed to the outside of the digital camera 1, directly being exposed to the external air. Therefore, all the heat transferred to the main chassis 12 can be released from the reinforcing portion 12a to the outside of the digital camera 1. Thus, since the heat can be released with the reinforcing portion 12a which is a part of the main chassis 12 directly contacting the external air, the internal heat of the digital camera 1 can efficiently be dissipated.

According to the present embodiment, since the strap attachment portion 20a can be reinforced by the reinforcing portion 12a formed by the main chassis 12 with a high mechanical strength, the strap attachment portion 20a can be formed of a resin material with a low mechanical strength. In addition, since the reinforcing portion 12a is not exposed to the exterior of the digital camera 1, the exterior appearance quality is less affected.

Therefore, for example, compared with the case where the strap attachment portion is formed of a polished metal, the structure of the strap attachment portion according to the present embodiment can reduce cost, having adequate strength and good exterior appearance quality.

In the digital camera 1 according to the first embodiment, the reinforcing portion 12a formed on the main chassis 12 overlaps the inside of the strap attachment portion 20a formed on the side surface cover 20, thus realizing adequate strength and good exterior appearance quality along with the cost reduction.

In contrast, according to a second embodiment, a strap attachment portion 112a to be a part of the exterior is formed on the main chassis 112 of a digital camera. In other words, the strap attachment portion 20a formed on the side surface cover 20 according to the first embodiment is not present, but a part of the main chassis 112 is exposed to the outside of the digital camera and becomes a part of the exterior of the digital camera. Since the other parts are similar to those of the above-described first embodiment, the descriptions thereof will not be made herein.

Figure 8:
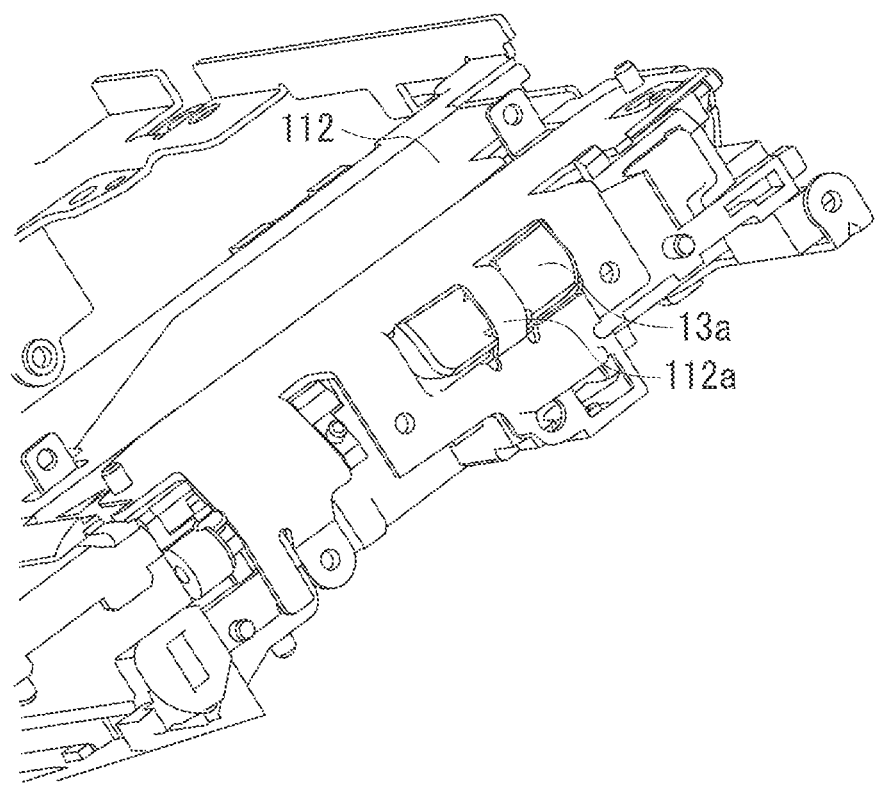
FIG. 8 is a diagram illustrating the shape of a strap attachment portion.

FIG. 8 is a diagram illustrating the shape of the strap attachment portion 112a formed on the main chassis 112 of the digital camera according to the second embodiment.

As illustrated in FIG. 8, both ends of the strap attachment portion 112a are connected to the main chassis 112. In addition, the chamfering process is performed on the end surfaces of the strap attachment portion 112a, thus preventing the strap cord 17 from being damaged even when the strap attachment portion 112a is formed on the main chassis 112 that is formed of a punched plate-shaped metallic material. Furthermore, as the strap attachment portion 112a becomes a part of the exterior of the digital camera, a barrel polishing process is performed.

Accordingly, adequate strength and good exterior appearance quality can be realized along with cost reduction.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-180359 filed Aug. 22, 2011, which is hereby incorporated by reference herein in its entirety.

What is claimed is:

1. An electronic apparatus to which can be attached a strap cord, the electronic apparatus comprising:
   a circuit board on which an electric element that generates heat is mounted;
   a chassis member to which the circuit board is fixed and through which the heat generated by the electric element is transferred;
   an interior member which is fixed to the chassis member; and
   an exterior cover which covers both of at least a part of the chassis member and at least a part of the interior member,
   wherein the exterior cover includes a strap attachment portion,
   wherein the interior member includes a strap reception portion,
   wherein the chassis member is formed of a metallic material and includes a reinforcing portion arranged to overlap the strap attachment portion, and
   wherein a space is provided between the reinforcing portion and the strap reception portion for passing through the strap cord
   wherein a front end portion of the reinforcing portion is not fixed to the interior member, and
   wherein the front end portion of the reinforcing portion is disposed on the line connecting fixing portions for fixing the chassis member and the exterior cover.

2. The electronic apparatus according to claim 1, wherein the interior member is a battery storage chamber for storing a battery.

3. The electronic apparatus according to claim 1, wherein a rib for covering an end surface of the reinforcing portion is formed on the strap attachment portion.

4. The electronic apparatus according to claim 1, wherein the chassis member is formed of a plate-shaped metallic material that is punched, and an end surface of the reinforcing portion contacted by the strap cord attached to the strap attachment portion becomes a burr surface, and wherein the burr surface is subjected to a chamfering process.

5. The electronic apparatus according to claim 1, wherein the chassis member is formed of a plate-shaped metallic material that is punched, and an end surface of the reinforcing portion contacted by the strap cord attached to the strap attachment portion becomes a rollover surface.

6. An electronic apparatus to which can be attached a strap cord, the electronic apparatus comprising:
   an interior member including a strap reception portion;
   a chassis member to which the interior member is fixed; and
   an exterior cover which covers both of at least a part of the chassis member and at least a part of the interior member,
   wherein the exterior cover includes a strap attachment portion,
   wherein the chassis member is formed of a metallic material,
   wherein the chassis member includes a reinforcing portion arranged to overlap the strap attachment portion,
   wherein a space is provided between the reinforcing portion and the strap reception portion for passing through the strap cord,
   wherein a front end portion of the reinforcing portion is not fixed to the interior member, and
   wherein the front end portion of the reinforcing portion is disposed on the line connecting fixing portions for fixing the chassis member and the exterior cover.

7. The electronic apparatus according to claim 6, wherein an end surface of the reinforcing portion contacted by the strap cord attached to the strap attachment portion becomes a burr surface, and wherein the burr surface is subjected to a chamfering process.

8. The electronic apparatus according to claim 6, wherein an end surface of the reinforcing portion contacted by the strap cord attached to the strap attachment portion becomes a rollover surface.

* * * * *